UNITED STATES PATENT OFFICE.

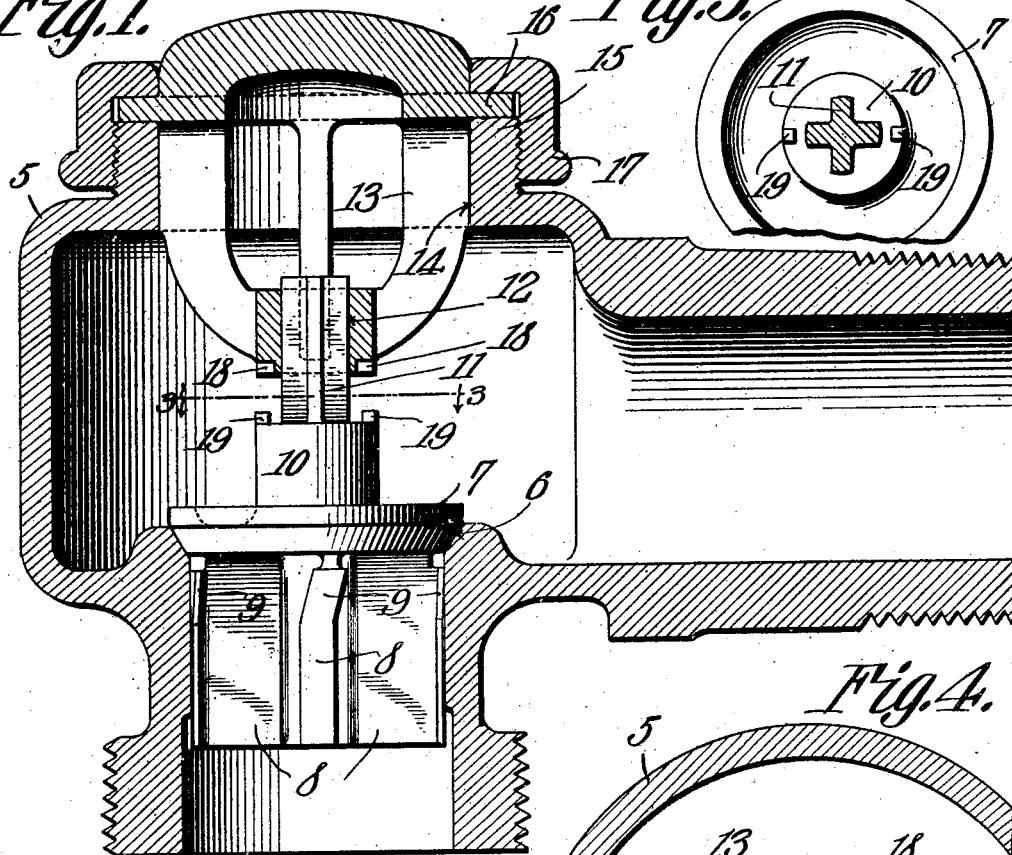

HARRY F. CUNNING, OF ROANOKE, VIRGINIA.

CHECK-VALVE.

937,773.

Specification of Letters Patent. Patented Oct. 26, 1909.

Application filed February 15, 1909. Serial No. 478,045.

*To all whom it may concern:*

Be it known that I, HARRY F. CUNNING, a citizen of the United States, residing at Roanoke, in the county of Roanoke and State of Virginia, have invented a new and useful Check-Valve, of which the following is a specification.

This invention relates to that class of check valves in which the construction is such that it is lifted off its seat with a rotary motion, the object thereof being to keep the valve seat and that portion of the valve casing in which the guide wings work clear of incrustations and corrosions. The continuous rotary movement of the valve causes rapid wear, and the object of the present invention is to provide a valve having only a slight rotary movement as it rises from the seat, the rotation of the valve being checked by the structure to be hereinafter described and claimed.

The invention also has for its object to provide improved means for guiding the movement of the valve.

In the accompanying drawings Figure 1 is an elevation of the valve, the casing being shown in section. Fig. 2 is a bottom plan view of the valve. Fig. 3 is a section on the line 3—3 of Fig. 1 looking down. Fig 4 is a section in the same plane looking up.

Referring more particularly to the drawings, 5 denotes the casing of the valve which, in the present instance, is an angle valve. In the casing is the seat 6 of the check valve. This valve is a disk 7 suitably shaped on its under side to snugly fit the seat. From the under side of the disk depend wings 8, which extend radially with respect to the axis of the valve, and have laterally deflected portions 9 adjacent to the disk, for a purpose to be presently made clear.

From the top of the disk 7 rises a guide stem 10 having a reduced portion 11 which works in an opening 12 in a cage 13 seating in an opening 14 made in the valve casing 5, and extending thereinto a suitable distance. On the outside of the valve casing, an annular flange 15 surrounds the opening 14, and the cage 13 has at its outer end an annular collar 16 which fits on said flange. The flange is screw-threaded on the outside to receive a coupling nut 17 which engages over the collar 16, and clamps the same to the flange 15, whereby the cage is securely held in place in the valve casing.

By securing the cage as herein described, it is always held central, and in position to properly guide the valve, and any wear of the threads of the flange 15 or the nut 17 will not affect its position.

On the bottom of the cage 13 are recesses 18 which are in the path of lugs 19 formed on the end of the portion 10 of the valve guide stem.

By laterally deflecting the wings 8 as shown at 9, the valve is given a rotary motion as it rises from its seat. However, this rotary motion is very short by reason of the fact that only short portions of the wings are laterally deflected, and also by reason of the fact that when the valve lifts and strikes the bottom of the cage 13, the recesses 18 are engaged by the lugs 19, and the rotation of the valve is therefore positively stopped. The continuous rotation of the valve with the attendant wear is therefore effectually prevented.

The valve structure herein described is simple, and there are no complicated parts to get out of order. The cage 13 also serves as a cap which can be readily removed if access to the valve is desired, upon unscrewing the nut 17.

What is claimed is:

1. In a check valve, a casing, a valve working therein, means for imparting a rotary movement to the valve as it rises off its seat, and a stop for checking said rotary movement of the valve.

2. In a check valve, a casing, a valve working therein, means for imparting a rotary motion to the valve as it rises off its seat, a guide stem on the valve, a cage extending into the valve casing and having an opening in which the guide stem works, the bottom of the cage having recesses, and lugs on the valve adapted to enter said recesses to check the rotary movement of the valve.

In testimony that I claim the foregoing as my own, I have hereto affixed my signature in the presence of two witnesses.

HARRY F. CUNNING.

Witnesses:
    GRACE HOMTROTH,
    HORACE RECTOR.